United States Patent [19]

Whitchurch

[11] 4,036,559

[45] July 19, 1977

[54] JOINT SECURING AN ARTICLE TO PARTICLE BOARD

[75] Inventor: Donald G. Whitchurch, Rockford, Ill.

[73] Assignee: Elco Industries, Inc., Rockford, Ill.

[21] Appl. No.: 612,317

[22] Filed: Sept. 11, 1975

[51] Int. Cl.² .............................................. F16B 7/18
[52] U.S. Cl. .................................. 403/405; 403/388; 85/48
[58] Field of Search ....................... 403/388; 85/41, 46, 85/47, 48; 52/753 F, 758 F, 753 C, 753 D

[56] References Cited

U.S. PATENT DOCUMENTS

| 410,698 | 9/1889 | Rogers | 85/48 |
|---|---|---|---|
| 1,885,028 | 10/1932 | Arenz | 85/46 X |
| 2,829,696 | 4/1958 | Wagner | 151/69 |
| 3,179,143 | 4/1965 | Schultz et al. | 403/388 X |

Primary Examiner—Wayne L. Shedd

Attorney, Agent, or Firm—Leydig, Voit, Osann, Mayer & Holt, Ltd.

[57] ABSTRACT

A joint structure for use in securing an article to the edge of a piece of composition board includes a screw having an elongated shank with an enlarged head integrally formed with one end thereof and a threaded section formed on the opposite end portion. First and second helical threads in the threaded section having different major diameters are used to secure the fastener within a pre-drilled hole formed in the edge of the particle board. The hole includes an outer end portion whose diameter is greater than the major diameter of the larger thread and whose length is approximately equal to the length of the threaded section of the shank. In addition, the hole includes an inner end portion which opens into and is coaxial with the outer end portion and which has a diameter smaller than the major diameter of the smaller thread. The length of the hole is longer than the length of the shank of the screw.

1 Claim, 3 Drawing Figures

JOINT SECURING AN ARTICLE TO PARTICLE BOARD

BACKGROUND OF THE INVENTION

The present invention relates to a joint structure such as may be employed in securing an article to the piece of composition board, that is, particle board, hard board, fiber board or the like such as may be formed of different sizes and textures of chemically-treated, wood or wood-like by-products or similar materials which are compressed in a layer and adhere together in a solid sheet. More particularly, the invention relates to a joint structure of the type wherein an elongated screw is employed to secure the article to the edge of the board by being threaded into a pre-drilled pilot hole extending into the edge of the board.

SUMMARY OF THE INVENTION

The primary aim of the present invention is to provide a new and improved joint structure of the foregoing general character through the use of which an article may be fastened more securely to the edge of the composition board and which is adapted particularly to avoid splitting or cracking the edge of the board as the screw is threaded into the board. A more detailed object is to achieve the foregoing by constructing the joint with a hole having an outer end portion whose diameter is larger than the major diameter of the thread of the screw and an inner end portion whose diameter is smaller than the major diameter of the screw thread with the outer portion of the hole extending a substantial distance into the edge so that the expansive forces created by threading the screw into the hole occur initially some distance from the edge of the board so as to keep from splitting or cracking the board at the edge.

These and other objects and advantages of the present invention will become more apparent from the following detailed description when taken in conjunction with the accompanying drawings.

DETAILED DESCRIPTION OF THE PREFERRED EMBODIMENT

Figure 1:
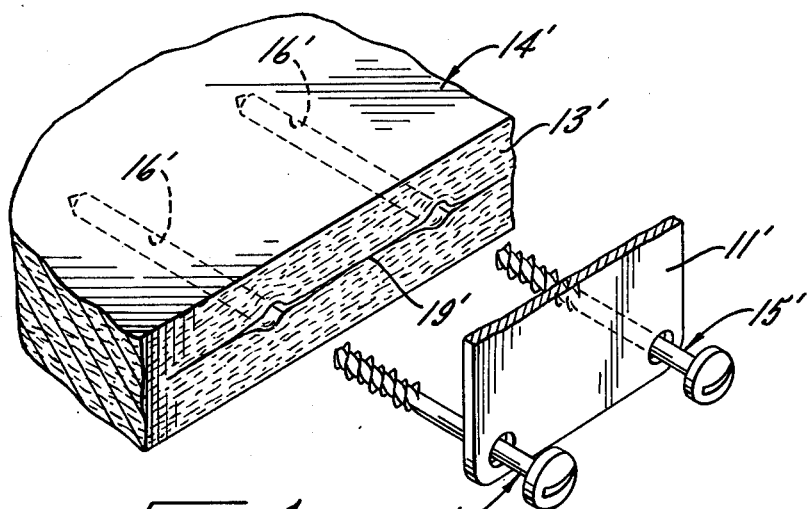
FIG. 1 is an exploded fragmentary perspective view of a prior art joint structure.

As shown in the drawings for purposes of illustration, the present invention is embodied in a joint structure 10 such as may be employed in securing an article 11 to the edge 13 of a piece of composition board 14. Typically, composition board such as particle board, hard board or fiber board is formed of different sizes and textures of chemically-treated wood or wood-like by-products or other similar materials which are compressed in a layer and adhere together in a solid sheet.

In making cabinets of composition board, it is often desirable that lids, doors, drawers or other parts of the cabinet be secured in place with fasteners extending into the edge of the composition board rather than through its thickness. By reason of the way in which composition board is formed, however, driving a fastener into the edge of the board tends to cause the board to split in directions extending generally parallel with the sides of the board. For instance, as is illustrated in the prior art arrangement of FIG. 1 wherein parts corresponding to those of the present invention are indicated by the same but primed reference numbers, when securing the wing 11' of a bracket to the edge 13' of the piece of composition board 14' such as by means of two screws 15', the board may be split by the screws even though the edge has been pre-drilled with holes 16'. This is simply because the fibers in the board are weakly bound together and cannot hold against the expansive forces generated in the board by the threads of the screws as they are turned into the board.

In accordance with the primary aim of the present invention, the joint structure 10 is constructed in a unique fashion so as to avoid splitting the composition board 14 when fastening an article 11 to the edge 13 of the board. Advantageously, this is achieved by forming the pre-drilled hole 16 with inner and outer end portions 17 and 18, the latter being larger in diameter than the major diameter of the thread of the screw 15 and extending a substantial distance into the edge of the board. The inner end portion of the hole is coaxial with the outer end portion and has a diameter less than the major diameter of the thread. By virtue of this construction, as the screw is initially threaded into the pre-drilled hole, the split 19' is kept from being started so that, once the screw is tightened in the board, it holds securely against being easily pulled out.

Figure 2:
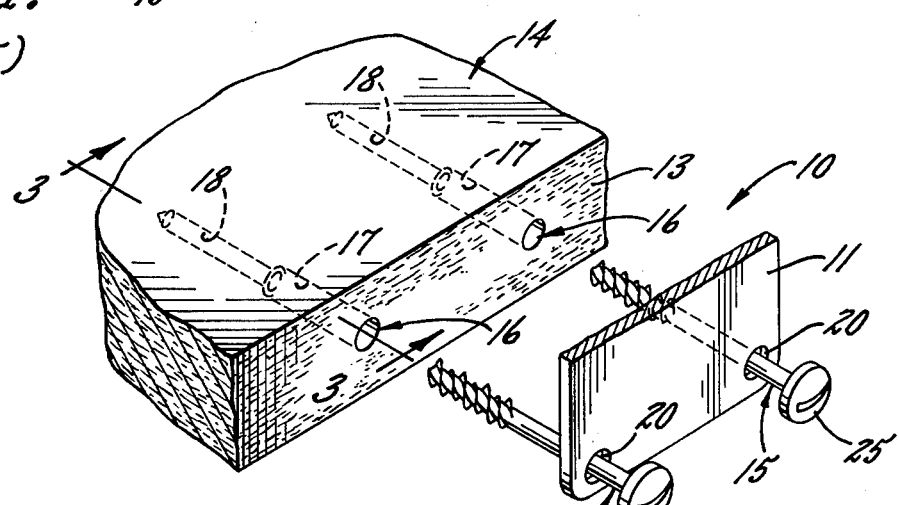
FIG. 2 is an exploded, fragmentary perspective view of a joint structure embodying the novel features of the present invention.
Figure 3:
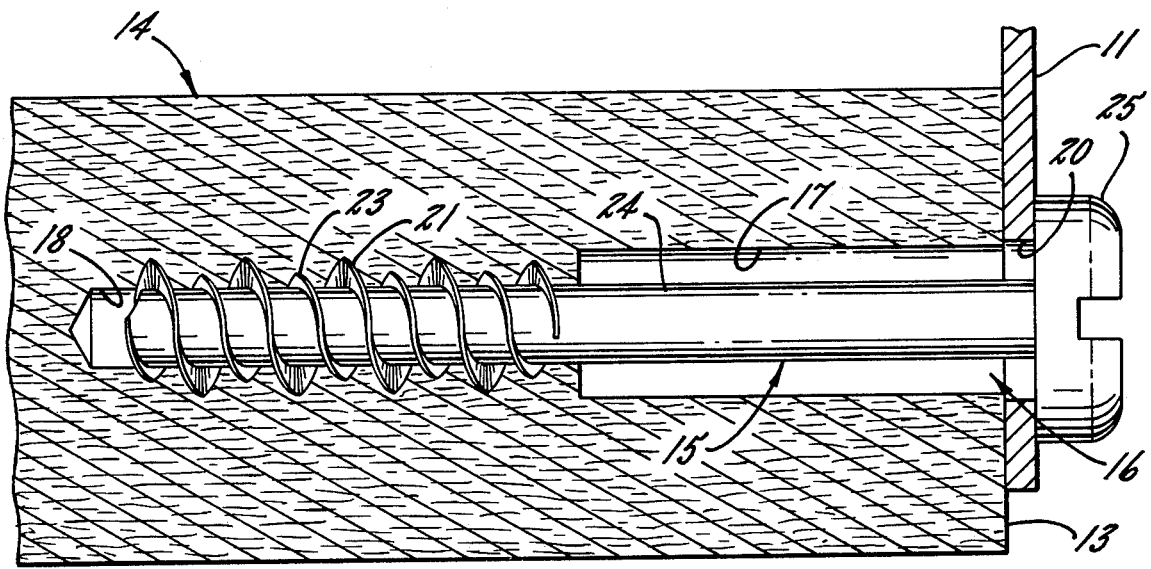
FIG. 3 is an enlarged, fragmentary cross-sectional view taken substantially along line 3—3 of FIG. 2 and showing the joint structure of the present invention in an assembled state.

As shown in FIG. 2, two of the screws 15 extend through apertures 20 in the bracket wing 11 and are used to secure the wing to the edge 13 of the composition board 14. Preferably, but not necessarily, each screw is of the type having an elongated shank 24 with an enlarged head 25 integrally formed with one end thereof. Formed in the opposite end portion of the shank are two separate, narrow root width threads 21 and 23 (see FIG. 3). Herein, the threads are of a so-called hi-lo profile with the major diameter of the first one 21 of the threads being substantially greater than the major diameter of the other one 23 of the threads. Moreover, the major diameter of the larger thread 21 is less than the diameter of the outer end portion 17 of the hole 16 and the diameter of the inner end portion 18 is less than the major diameter of the smaller thread 23 and, preferably, is less than the diameter of the shank 24 of the screw. Accordingly, the larger thread extends radially beyond the inner end portion of the hole and into the composition board a substantial distance greater than the distance which the smaller thread extends into the board. To anchor the screw 15 in the board 14, both of the threads 21 and 23 extend in an axial direction from the lower end of the screw a distance less than one-half the length of the screw shank 24. In addition, the axial length of the outer end portion of the hole is approximately equal to the axial length of the two threads while the axial length of the inner end portion of the hole is longer, the combined axial lengths of the two portions of the hole being greater than the axial length of the shank. By virtue of this construction of the joint structure 10, the holding strength provided by the threads is concentrated well within the board rather than being distributed along the full length of the shank and close to the surface of the edge thereby to avoid splitting the board.

Thus, it is seen from the foregoing that by pre-drilling the hole 16 in the foregoing fashion with the larger and smaller outer and inner end portions 17 and 18, the screw 15 is kept from splitting the edge 13 of the composition board 14 upon being initially turned into the board. This is because the threads 21 and 23 are turned into the board at a substantial distance from the edge and thus the forces generated in the board by the threads and tending to split the board are concentrated well away from the edge surface to avoid starting the split at the edge. Accordingly, once the screw is tightened down, the bracket wing or article 11 is held more securely to the edge of the board, the threads holding the screw within the board and against being easily pulled out.

I claim:

1. A joint structure including a piece of composition board having a peripheral edge, a hole formed in and extending inwardly from the edge of said board, an article having an aperture formed therethrough, and a screw extending inwardly through said aperture and into said hole to secure said article to said board, said screw having an elongated shank of substantially uniform diameter and having an enlarged head formed integrally on the outer end of said shank, first and second helical threads formed on the inner portion of said shank with said first thread having a major diameter greater than the major diameter of said second thread and said shank, the outer portion of said shank between said inner portion and said head being unthreaded, said hole including an outer section having a diameter greater than the major diameter of said first thread and further including a coaxial inner section having a diameter somewhat less than the diameter of said shank, said inner section of said inner section of said hole having a length greater than the length of the inner threaded portion of said shank and receiving the entire length of said threaded portion and part of the length of said outer unthreaded portion, and said outer section of said hole having a length at least equal to the length of said inner threaded portion of said shank and less than the length of said outer unthreaded portion of said shank and receiving the latter portion with radial clearance.

* * * * *